(12) United States Patent
Fujiwara (10) Patent No.: US 9,994,183 B2
(45) Date of Patent: Jun. 12, 2018

(54) REAR SEAT SIDE AIRBAG DEVICE

(71) Applicant: Toyota Jidosha Kabushiki Kaisha, Toyota-shi, Aichi-ken (JP)

(72) Inventor: Yusuke Fujiwara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/148,548

(22) Filed: May 6, 2016

(65) Prior Publication Data
US 2017/0066400 A1   Mar. 9, 2017

(30) Foreign Application Priority Data

Sep. 4, 2015   (JP) ................................. 2015-174903

(51) Int. Cl.
*B60R 21/217* (2011.01)
*B60R 21/207* (2006.01)
*B60R 21/231* (2011.01)
*B60R 21/00* (2006.01)

(52) U.S. Cl.
CPC .......... *B60R 21/217* (2013.01); *B60R 21/207* (2013.01); *B60R 21/23138* (2013.01); *B60R 2021/0032* (2013.01); *B60R 2021/2078* (2013.01); *B60R 2021/23146* (2013.01); *B60R 2021/23153* (2013.01)

(58) Field of Classification Search
CPC ................ B60R 21/217; B60R 21/207; B60R 21/23138; B60R 2021/23153; B60R 2021/2078; B60R 2021/23146; B60R 2021/0032
See application file for complete search history.

(56) References Cited

U.S. PATENT DOCUMENTS

| | | | | |
|---|---|---|---|---|
| 5,564,735 A | * | 10/1996 | Boy | ........................ B60R 21/21 |
| | | | | 280/730.2 |
| 7,530,595 B2 | * | 5/2009 | Naruse | .................... B60R 21/21 |
| | | | | 280/728.2 |
| 7,677,594 B2 | * | 3/2010 | Hazlewood | .......... B60N 2/5883 |
| | | | | 280/728.2 |

(Continued)

FOREIGN PATENT DOCUMENTS

| | | |
|---|---|---|
| JP | 2006-088774 A | 4/2006 |
| JP | 2006-088850 A | 4/2006 |

(Continued)

*Primary Examiner* — Paul N Dickson
*Assistant Examiner* — Timothy Wilhelm
(74) *Attorney, Agent, or Firm* — Dinsmore & Shohl LLP (57) ABSTRACT

A rear seat side airbag device comprising: a case that is disposed at a vehicle width direction outer-side of a seatback of a rear seat and configured including, in vehicle plan view, a bottom wall extending along a vehicle width direction and a pair of side walls extending toward a vehicle front from respective vehicle width direction end portions of the bottom wall, one of the side walls being formed with a shorter vehicle front-rear direction length than the other of the side walls; and an airbag module that is housed in the case and configured including a side airbag and an inflator, the inflator supplying gas to the side airbag and including a stud bolt projecting out in a vehicle width direction and fastened to the one side wall or the other side wall by the stud bolt.

8 Claims, 6 Drawing Sheets

(56) References Cited

U.S. PATENT DOCUMENTS

| | | | | |
|---|---|---|---|---|
| 8,123,246 B2* | 2/2012 | Gilbert | ................ | B60R 21/207 |
| | | | | 280/728.2 |
| 8,534,701 B2* | 9/2013 | Sosnowski | ............. | B60R 21/20 |
| | | | | 180/65.21 |
| 8,596,674 B2* | 12/2013 | Fukawatase | ......... | B60N 2/4492 |
| | | | | 280/728.2 |
| 8,651,518 B2* | 2/2014 | Shamoto | ............... | B60N 2/289 |
| | | | | 280/730.2 |
| 8,662,531 B2* | 3/2014 | Tracht | .................. | B60R 21/207 |
| | | | | 280/730.2 |
| 8,752,861 B2* | 6/2014 | Fukawatase | .......... | B60N 2/289 |
| | | | | 280/728.2 |
| 2006/0061073 A1 | 3/2006 | Naruse et al. | | |
| 2007/0182131 A1* | 8/2007 | Helbig | ............... | B60R 21/2165 |
| | | | | 280/728.2 |
| 2009/0039623 A1 | 2/2009 | Kawabe et al. | | |
| 2013/0175792 A1 | 7/2013 | Fukawatase et al. | | |
| 2013/0200599 A1 | 8/2013 | Shamoto et al. | | |
| 2014/0197621 A1* | 7/2014 | Thomas | ............... | B60R 21/207 |
| | | | | 280/730.2 |
| 2015/0151711 A1* | 6/2015 | Fujiwara | .............. | B60R 21/207 |
| | | | | 280/728.2 |
| 2016/0288838 A1* | 10/2016 | Kindaichi | ........... | B62D 21/157 |

FOREIGN PATENT DOCUMENTS

| | | |
|---|---|---|
| JP | 2008-080988 A | 4/2008 |
| JP | 2009-040326 A | 2/2009 |
| JP | 2009-040328 A | 2/2009 |
| JP | 2009-143379 A | 7/2009 |
| WO | 2012/035619 A1 | 3/2012 |
| WO | 2012/053082 A1 | 4/2012 |

* cited by examiner

REAR SEAT SIDE AIRBAG DEVICE

CROSS-REFERENCE TO RELATED APPLICATION

This application claims priority under 35 USC 119 from Japanese Patent Application, No. 2015-174903 filed Sep. 4, 2015, the disclosure of which is incorporated by reference herein in its entirely.

BACKGROUND

Technical Field

Embodiments of the present disclosure relate to a rear seat side airbag device.

Related Art

Japanese Patent Application Laid-Open (JP-A) No. 2006-088774 describes a structure in which an airbag module including a side airbag and an inflator is provided at a vehicle width direction outside of a seatback of a rear seat. The airbag module is housed in a case. The case includes a pair of side walls and a bottom wall, and has a cross-section profile viewed from above the vehicle formed in substantially a U-shape open toward the vehicle front side. A stud bolt projects out from the inflator toward the vehicle rear side, and the inflator is fastened to the bottom wall of the case by the stud bolt.

JP-A No. 2009-143379 describes a structure in which a stud bolt projects out from an inflator of a side airbag device toward a vehicle width direction inside. The inflator is fastened to a seatback frame by the stud bolt.

SUMMARY

However, in the technology described in JP-A No. 2006-088774, the stud bolt projects out from the inflator toward the vehicle rear side, so that there is a possibility of the stud bolt impeding on the body of a wheelhouse or the like provided at the vehicle rear side of the airbag module. In the technology described in JP-A No. 2009-143379, a vehicle width direction length (width) of the case needs to be widened so that the stud bolt does not contact a side wall of the case when assembling the airbag module to the case, such that there is room for improvement from the perspective of saving space.

In consideration of the above circumstances, an object of one of the embodiments is to provide a rear seat side airbag device capable of saving space in configurations in which an airbag module is fastened to a case by a stud bolt projecting out from the inflator in a vehicle width direction.

A rear seat side airbag device of a first aspect of the disclosure includes: a case that is disposed at a vehicle width direction outer-side of a seatback of a rear seat and configured including, in vehicle plan view, a bottom wall extending along a vehicle width direction and a pair of side walls extending toward a vehicle front from respective vehicle width direction end portions of the bottom wall, one of the side walls being formed with a shorter vehicle front-rear direction length than the other of the side walls; and an airbag module that is housed in the case and configured including a side airbag that deploys at a side portion of an occupant in a collision and an inflator, the inflator supplying gas to the side airbag and including a stud bolt projecting out in a vehicle width direction and fastened to the one side wall or the other side wall by the stud bolt.

In the rear seat side airbag device of the first aspect, the case is configured including, in vehicle plan view, the bottom wall extending along a vehicle width direction and the pair of side walls extending toward a vehicle front from the respective vehicle width direction end portions of the bottom wall. One side wall out of the pair of side walls configuring the case is formed with a shorter vehicle front-rear direction length than the other side wall. The airbag module is assembled to the case. The airbag module is configured including the side airbag and the inflator. The inflator includes the stud bolt projecting out in a vehicle width direction and the inflator is fastened to the side wall of the case by the stud bolt. Note that an opening area of the case is increased by making the vehicle front-rear direction lengths of the side walls of the case different from each other. This enables the airbag module to be diagonally inserted into the case when assembling the airbag module to the case. This accordingly enables the case width to be formed narrower than in a structure in which the case width is widened to account for the length of the stud bolt.

A rear seat side airbag device of a second aspect of the disclosure has the configuration of the first aspect, wherein the side wall at a vehicle width direction inner-side of the case is formed with a shorter vehicle front-rear direction length than the side wall at a vehicle width direction outer-side of the case.

In the rear seat side airbag device of the second aspect, the side wall at a vehicle width direction inside that is nearest to an occupant is formed with a shorter vehicle front-rear direction length. This enables interference between the occupant and the case to be avoided or suppressed, even in cases in which the occupant has moved under inertia toward the rear seat side airbag device side in a collision such as a side-on collision.

A rear seat side airbag device of a third aspect of the disclosure has the configuration of the first aspect or the second aspect, wherein the inflator is fastened to the side wall at a vehicle width direction outer-side by the stud bolt projecting out toward a vehicle width direction outer-side.

The rear seat side airbag device of the third aspect enables interference between the occupant and the stud bolt to be avoided or suppressed, even in cases in which the occupant has moved under inertia toward the rear seat side airbag device side in a collision such as a side-on collision.

A rear seat side airbag device of a fourth aspect of the disclosure has the configuration of any one of the first aspect to the third aspect, wherein: in a case in which, in vehicle plan view, a length of a line linking respective front ends of the pair of side walls of the case is an opening length; and in vehicle plan view, a length of a diagonal line linking a corner portion at a vehicle rear end side and one vehicle width direction end side of the airbag module, and a corner portion at a vehicle front end side and the other vehicle width direction end side of the airbag module, is a diagonal length; then the opening length is formed longer than the diagonal length.

In the rear seat side airbag device of the fourth aspect, the opening length is formed longer than the diagonal length. Thus, the corner portions of the airbag module do not need to contact opening edges when the airbag module is being diagonally inserted into the case. This enables the airbag module to be easily assembled to the case, compared to a structure in which the opening length is shorter than the diagonal length.

As explained above, the rear seat side airbag device of the first aspect has an excellent advantageous effect of enabling space to be saved in configurations in which the airbag module has been fastened to the case by the stud bolt projecting out of the inflator in a vehicle width direction.

The rear seat side airbag devices described in the second aspect and the third aspect have an excellent advantageous effect of enabling protection performance of an occupant in a side-on collision to be improved.

The rear seat side airbag device of the fourth aspect has an excellent advantageous effect of enabling the operation efficiency of the assembly operation when assembling the airbag module to the case to be improved.

BRIEF DESCRIPTION OF THE DRAWINGS

Embodiments will be described in detail based on the following figures, wherein.

DETAILED DESCRIPTION

Explanation follows regarding a rear seat side airbag device according to an exemplary embodiment, with reference to the drawings. Note that in each of the drawings as appropriate, the arrow FR indicates the vehicle front side, the arrow UP indicates the vehicle upper side, and the arrow RH indicates the vehicle right side when facing the direction of progress. In the below explanation, unless specifically stated otherwise, reference to the front-rear, up-down, and left-right directions refers to front and rear in the vehicle front-rear direction, up and down in the vehicle up-down direction, and left and right when facing the direction of progress.

Figure 1:
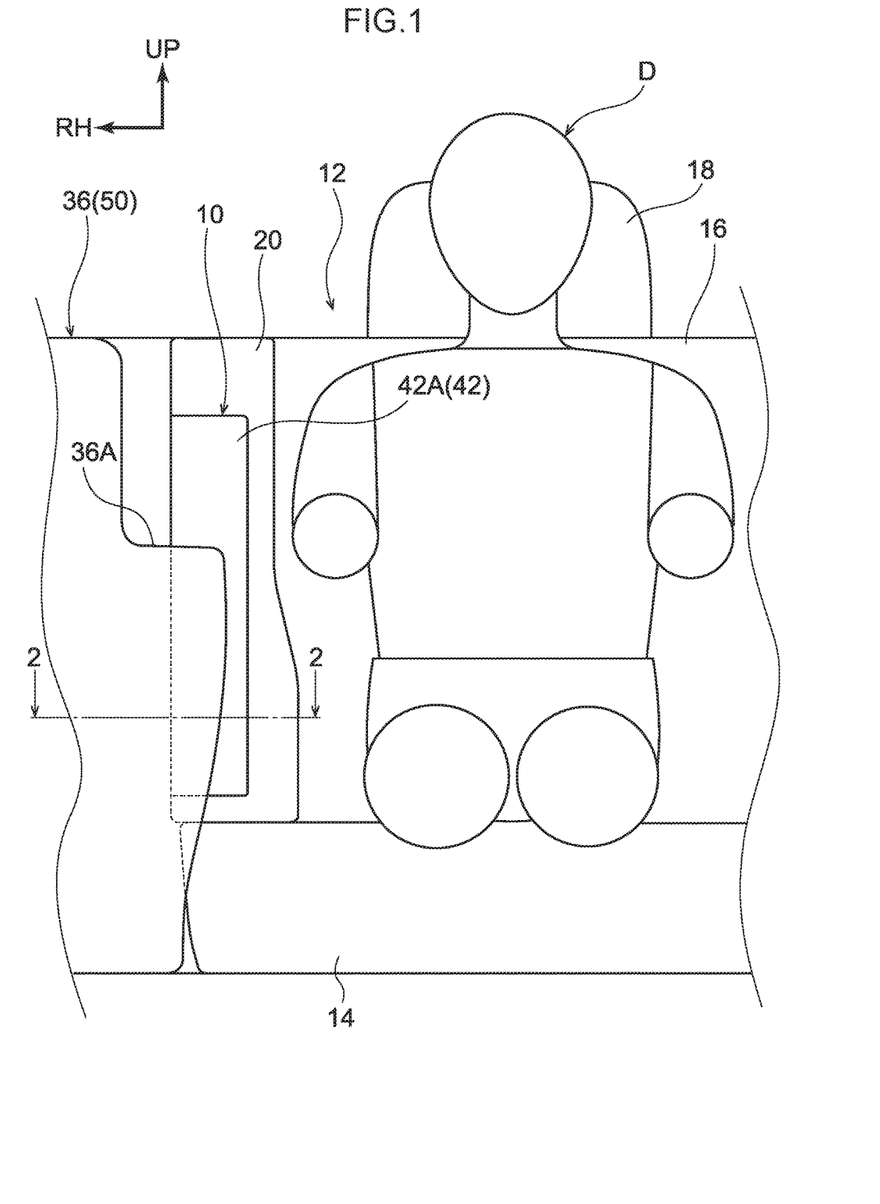
FIG. 1 is a face-on view illustrating a rear seat applied with a rear seat side airbag device according to an exemplary embodiment.

FIG. 1 is a face-on view illustrating a rear seat 12 applied with a rear seat side airbag device 10 according to the present exemplary embodiment, when viewing the vehicle from the face-on side. FIG. 1 also illustrates a crash test dummy (doll), serving as a model of an occupant to be protected, in a state seated on a seat cushion 14 of the rear seat 12. The dummy is, for example, a World Side Impact Dummy (World SID) of a $50^{th}$ percentile American adult male (AM50). The dummy is seated in a standard seated posture specified in crash testing methods, and the rear seat 12 is positioned in a reference set position corresponding to the seated posture. In order to facilitate understanding of the explanation, the dummy is hereafter referred to as "occupant D".

As illustrated in FIG. 1, the rear seat 12 is configured including the seat cushion 14 and a seatback 16, and a headrest 18 for supporting the head of the occupant D is provided at an upper end portion of the seatback 16.

A side garnish 20 is provided at either vehicle width direction side of the seatback 16 of the rear seat 12, and the rear seat side airbag device 10 is assembled to the side garnish 20. Note that only the side garnish 20 and the rear seat side airbag device 10 at the vehicle right side of the seatback 16 are illustrated in FIG. 1; however, the side garnish 20 and the rear seat side airbag device 10 are also similarly provided at the vehicle left side of the seatback 16. Since the vehicle right side rear seat side airbag device 10 and the vehicle left side rear seat side airbag device 10 are configured with left-right symmetry, explanation follows only regarding the vehicle right side rear seat side airbag device 10. In FIG. 1, illustration of a seatbelt (webbing) to restrain the occupant has been omitted for ease of explanation.

Figure 2:
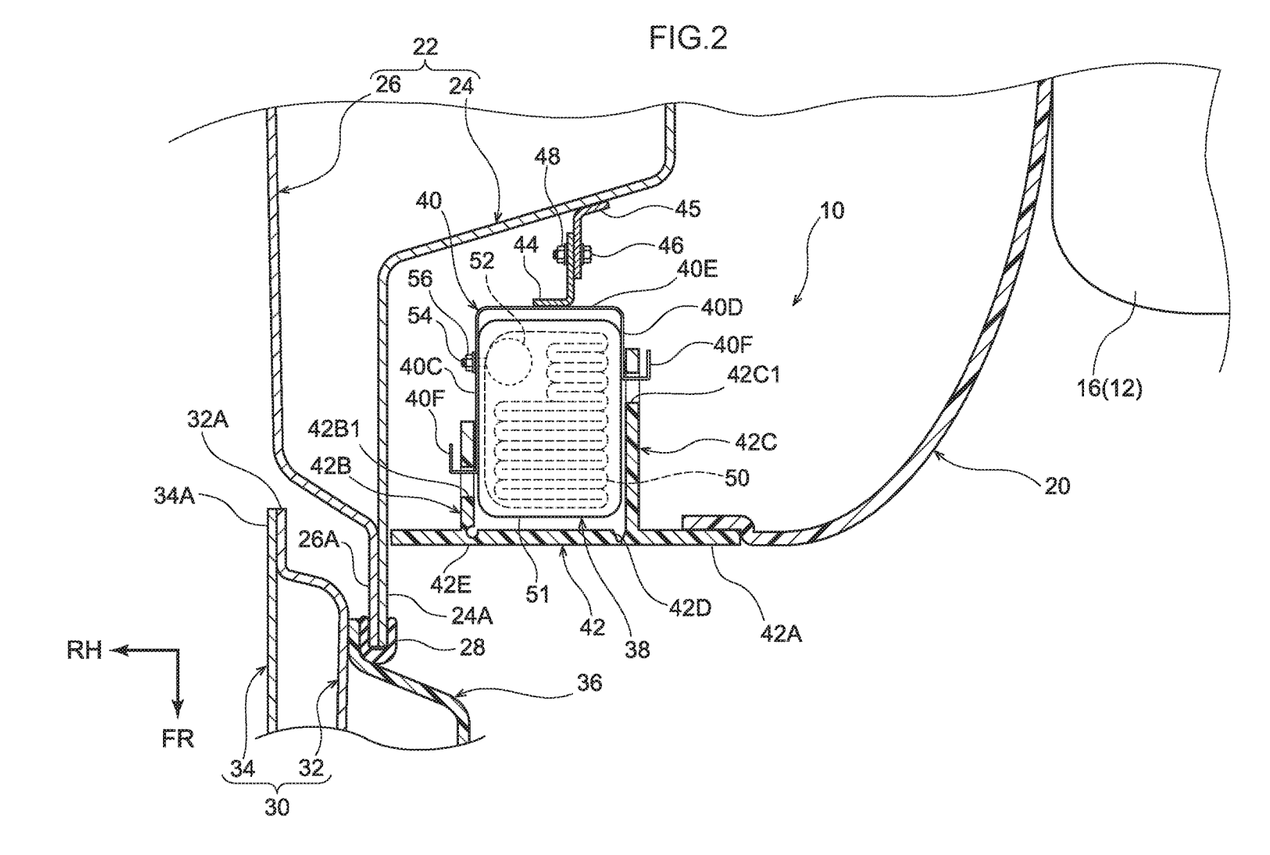
FIG. 2 is an enlarged cross-section illustrating a state sectioned along line 2-2 in FIG. 1.

As illustrated in FIG. 2, the side garnish 20 is provided between the seatback 16 and a wheelhouse 22, and is formed of resin. The rear seat side airbag device 10 is assembled to a vehicle right side (vehicle width direction outside) end portion of the side garnish 20. The rear seat side airbag device 10 will be described later.

The wheelhouse 22 is configured including a wheelhouse inner panel 24 configuring an inner panel, and a wheelhouse outer panel 26 configuring an outer panel. The wheelhouse inner panel 24 extends in the vehicle front-rear direction alongside a side portion at the vehicle right side of the rear seat side airbag device 10, and bulges out toward the vehicle left side (vehicle width direction inside) further toward the vehicle rear side than the rear seat side airbag device 10. An inner side flange 24A is formed to a front end portion of the wheelhouse inner panel 24.

The wheelhouse outer panel 26 extends along the vehicle front-rear direction at the vehicle right side of the wheelhouse inner panel 24, and a closed cross-section is configured between the wheelhouse outer panel 26 and the wheelhouse inner panel 24. An outer side flange 26A is formed alongside the inner side flange 24A at a front end portion of the wheelhouse outer panel 26. The inner side flange 24A and the outer side flange 26A are joined together to configure a rear edge of a door opening. A weather strip 28 is attached to a joint portion between the inner side flange 24A and the outer side flange 26A.

A rear side door 30 is disposed further toward the vehicle front than the wheelhouse 22. The rear side door 30 is configured including a door inner panel 32 configuring an inner panel, and a door outer panel 34 configuring an outer panel. An inner side flange 32A formed to a peripheral edge of the door inner panel 32 and an outer side flange 34A formed to a peripheral edge of the door outer panel 34 are joined together. A resin door trim 36, this being an interior component, is attached to the vehicle left side of the door inner panel 32.

As illustrated in FIG. 1, an armrest 36A that juts out toward the vehicle left side is provided to the resin door trim 36. The armrest 36A overlaps with part of the side garnish 20 and part of the rear seat side airbag device 10 when the vehicle is viewed from the face-on side.

As illustrated in FIG. 2, the rear seat side airbag device 10 is configured including an airbag module 38, a case 40, and an airbag door garnish 42 (hereafter referred to as "airbag door 42" as appropriate). The airbag module 38 is housed inside the case 40, and is configured including a side airbag 50, this being a bag body that is inflated and deployed at a side portion of the occupant D in a collision, and an inflator 52 for supplying gas to the side airbag 50. Details of the airbag module 38 will be described later.

Figure 3:
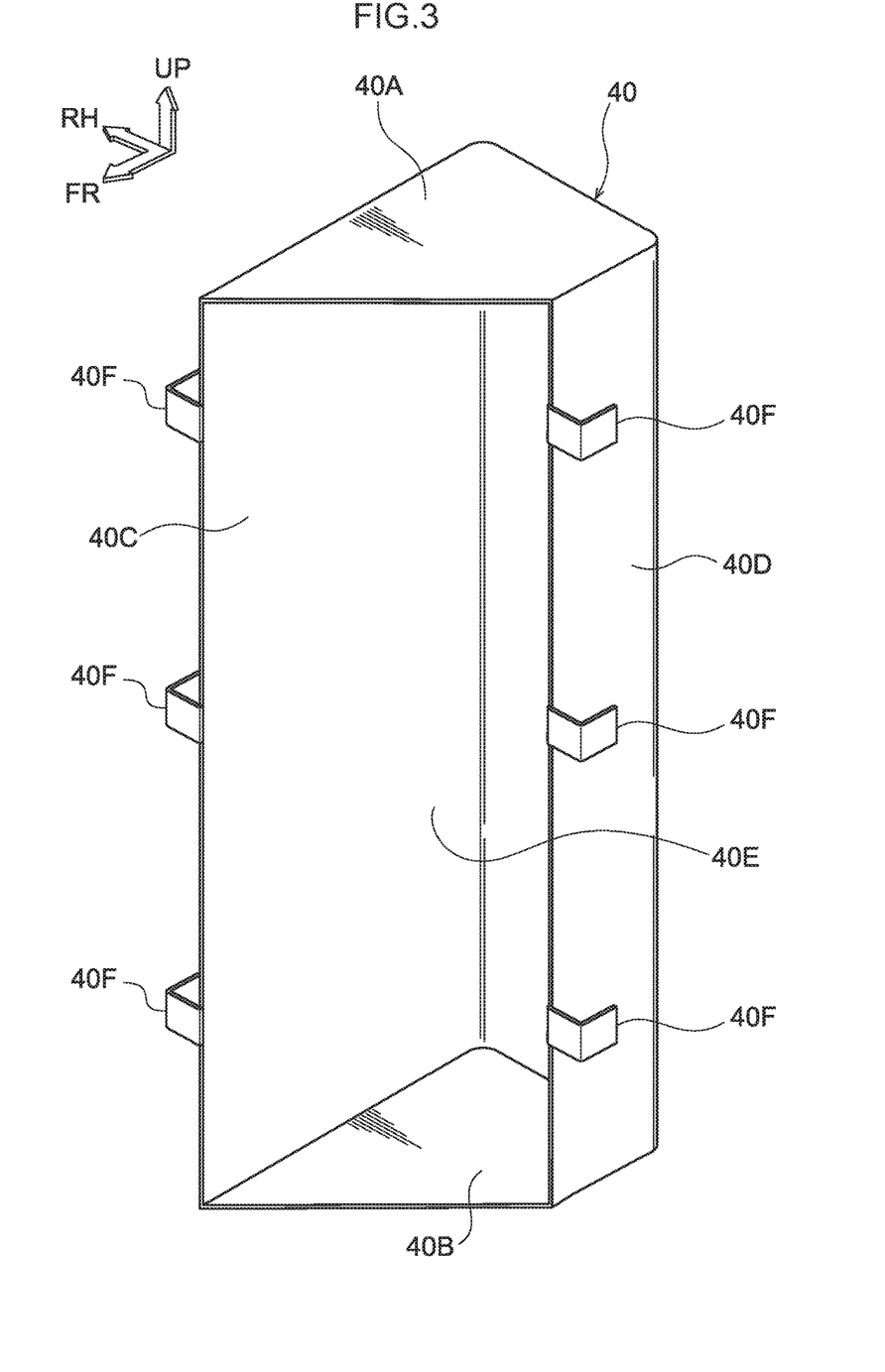
FIG. 3 is an enlarged perspective view illustrating a case configuring a rear seat side airbag device according to an exemplary embodiment.

As illustrated in FIG. 3, the case 40 that houses the airbag module 38 is formed in a box shape open toward the vehicle front side, and has a substantially rectangular shape with its length direction along the vehicle up-down direction when the vehicle is viewed face-on. The case 40 is configured including an upper wall 40A, a lower wall 40B and side wall 40C, a side wall 40D, and a bottom wall 40E, and has a cross-section profile formed in a substantially U-shape open toward the vehicle front side viewed from above the vehicle.

The upper wall 40A and the lower wall 40B respectively configure an upper face and a lower face of the case 40, and are each formed in a substantially trapezoidal shape with the vehicle left side as an upper base and the vehicle right side as a lower base in plan view of the vehicle. The bottom wall 40E links rear end portions of the upper wall 40A and the lower wall 40B in the vehicle up-down direction, and, as illustrated in FIG. 2, extends along a vehicle width direction in plan view of the vehicle.

The side wall 40C and the side wall 40D extend toward the vehicle front from the two respective vehicle width direction end portions of the bottom wall 40E, and are disposed facing each other in a vehicle width direction with a spacing therebetween. The side wall 40D at the vehicle left side (vehicle width direction inside) is formed with a shorter length in the vehicle front-rear direction than the side wall 40C at the vehicle right side (vehicle width direction outside).

As illustrated in FIG. 3, plural anchor hooks 40F are formed to the side wall 40C and the side wall 40D. In the present exemplary embodiment, three of the anchor hooks 40F are respectively formed to the side wall 40C and to the side wall 40D. Each anchor hook 40F extends toward the outside from a front end edge of the side wall 40C or the side wall 40D, and then bends toward the vehicle rear. Each anchor hook 40F is accordingly formed in substantially an L-shape in plan view of the vehicle.

As illustrated in FIG. 2, the case 40 is assembled to the airbag door 42 by anchoring the anchor hooks 40F to the airbag door garnish 42. An L-shaped bracket 44 is joined to a vehicle rear side face of the bottom wall 40E of the case 40. An L-shaped bracket 45 is joined to the wheelhouse inner panel 24, and the L-shaped bracket 44 at the case 40 side and the L-shaped bracket 45 at the wheelhouse inner panel 24 side are fastened together by a bolt 46 and a nut 48. The case 40 is accordingly fixed to the wheelhouse 22.

The airbag door 42 assembled to the case 40 is configured including a lateral wall portion 42A that extends along a vehicle width direction in cross-section plan view of the vehicle, and a vertical wall portion 42B and vertical wall portion 42C that extend toward the vehicle rear side from the lateral wall portion 42A.

The lateral wall portion 42A extends along a vehicle width direction between the side garnish 20 and the wheelhouse inner panel 24. The lateral wall portion 42A is formed in a substantially rectangular shape with its length direction along the vehicle up-down direction when the vehicle is viewed face-on (see FIG. 1).

The vertical wall portion 42B and the vertical wall portion 42C are disposed facing each other in a vehicle width direction, and the vertical wall portion 42B extends out toward the vehicle rear from further toward the vehicle right side than a vehicle width direction center portion of the lateral wall portion 42A. The vertical wall portion 42C extends out toward the vehicle rear from further toward the vehicle left side than a vehicle width direction center portion of the lateral wall portion 42A. The vertical wall portion 42C extends further toward the vehicle rear than the vertical wall portion 42B.

Note that anchor holes 42B1 are formed in the vertical wall portion 42B, and the anchor hooks 40F formed to the side wall 40C of the case 40 are anchored in the anchor holes 42B1. Anchor holes 42C1 are formed in the vertical wall portion 42C, and the anchor hooks 40F formed to the side wall 40D of the case 40 are anchored in the anchor holes 42C1.

A thinned tear portion 42D is formed in the lateral wall portion 42A at a base portion of the vertical wall portion 42C. The tear portion 42D forms a prospective break portion that breaks under the inflation pressure of the side airbag 50, described later. A thinned hinge portion 42E is formed in the lateral wall portion 42A at a base portion of the vertical wall portion 42B. The hinge portion 42E is formed with thicker thickness than the tear portion 42D. When the tear portion 42D breaks during inflation and deployment of the side airbag 50, the hinge portion 42E acts a hinge, and a portion of the lateral wall portion 42A between the tear portion 42D and the hinge portion 42E opens toward the vehicle front about the hinge portion 42E.

Explanation follows regarding the airbag module 38. The airbag module 38 is housed in the case 40, and has a front end portion that projects out further toward the vehicle front side than an opening of the case 40. The airbag module 38 includes the bag shaped side airbag 50, and, as an example, the side airbag 50 is wrapped in an easily torn wrapping material 51 in a state folded in a pleated shape. Note that the folding method of the side airbag 50 is not limited to a pleated shape, and other folding methods may be employed. The side airbag 50 may be folded in a rolled shape, for example, or may be housed without being folded.

The wrapping material 51 is wrapped round the inflator 52 as well as the side airbag 50. A combustion type or cold gas type inflator 52 is employed, and gas generated on actuation is supplied into the side airbag 50. In the present exemplary embodiment, the inflator 52 is a cylinder type inflator disposed with its length direction along the vehicle up-down direction. The inflator 52 is electrically connected to an electronic control unit (ECU), not illustrated in the drawings, this being a controller, and is actuated by the ECU in a vehicle collision.

The inflator 52 includes a stud bolt 54 projecting out toward the vehicle right side, and the stud bolt 54 projects out further to the outside than the wrapping material 51. In a state in which the airbag module 38 has been housed in the case 40, the stud bolt 54 is inserted through a bolt hole, not illustrated in the drawings, formed in the side wall 40C of the case 40, and screwed onto a nut 56. The inflator 52 is fastened to the side wall 40C of the case 40 in this manner.

Operation and Advantageous Effects

Explanation follows regarding operation and advantageous effects of an occupant restraint control device according to the present exemplary embodiment.

In the present exemplary embodiment, the stud bolt 54 projects out of the inflator 52 toward the vehicle right side (vehicle width direction outside), and the inflator 52 is fastened to the side wall 40C of the case 40 by the stud bolt 54. This enables the stud bolt 54 to be suppressed from impeding on the wheelhouse 22, even in cases in which there is only a narrow gap in the vehicle front-rear direction between the case 40 and the wheelhouse inner panel 24.

Namely, in a hypothetical structure in which the stud bolt 54 projects out toward the vehicle rear side from the inflator 52, the inflator 52 is fastened to the bottom wall 40E of the case 40 by the stud bolt 54, such that the stud bolt 54 projects out toward the vehicle rear side from the bottom wall 40E. In such a structure, the stud bolt 54 sometimes impedes on the wheelhouse 22 in cases in which there is a narrow gap in the vehicle front-rear direction between the case 40 and the wheelhouse inner panel 24, and the rear seat side airbag device 10 sometimes cannot be assembled at a specific position.

In contrast thereto, in a structure in which the stud bolt 54 projects out in a vehicle width direction (the vehicle right side or the vehicle left side) from the inflator 52 as in the present exemplary embodiment, the stud bolt 54 can be suppressed from impeding on the wheelhouse 22, regardless of the vehicle front-rear direction length of the airbag module 38. Since interference between the stud bolt 54 and the wheelhouse 22 does not need to be taken into consideration, the bottom wall 40E of the case 40 can be brought closer to the wheelhouse 22. This enables the side garnish 20 to be more compact, and the space inside the vehicle to be increased.

In the present exemplary embodiment, the lengths of the side wall 40C and the side wall 40D configuring the case 40 are set at different lengths to each other, such that the area of the opening of the case 40 is increased. This enables the airbag module 38 to be diagonally inserted into the case 40 when assembling the airbag module 38 to the case 40. Namely, a vehicle width direction length (width) of the airbag module 38 longer by the length of the stud bolt 54; however, a vehicle width direction length of the case 40 does not need to be made any longer to account for this. Namely, the width of the case 40 can be made narrower than a structure in which a vehicle width direction length (width) of the case 40 is widened to account for the length of the stud bolt 54. Namely, a saving in space can be achieved.

Figure 4:
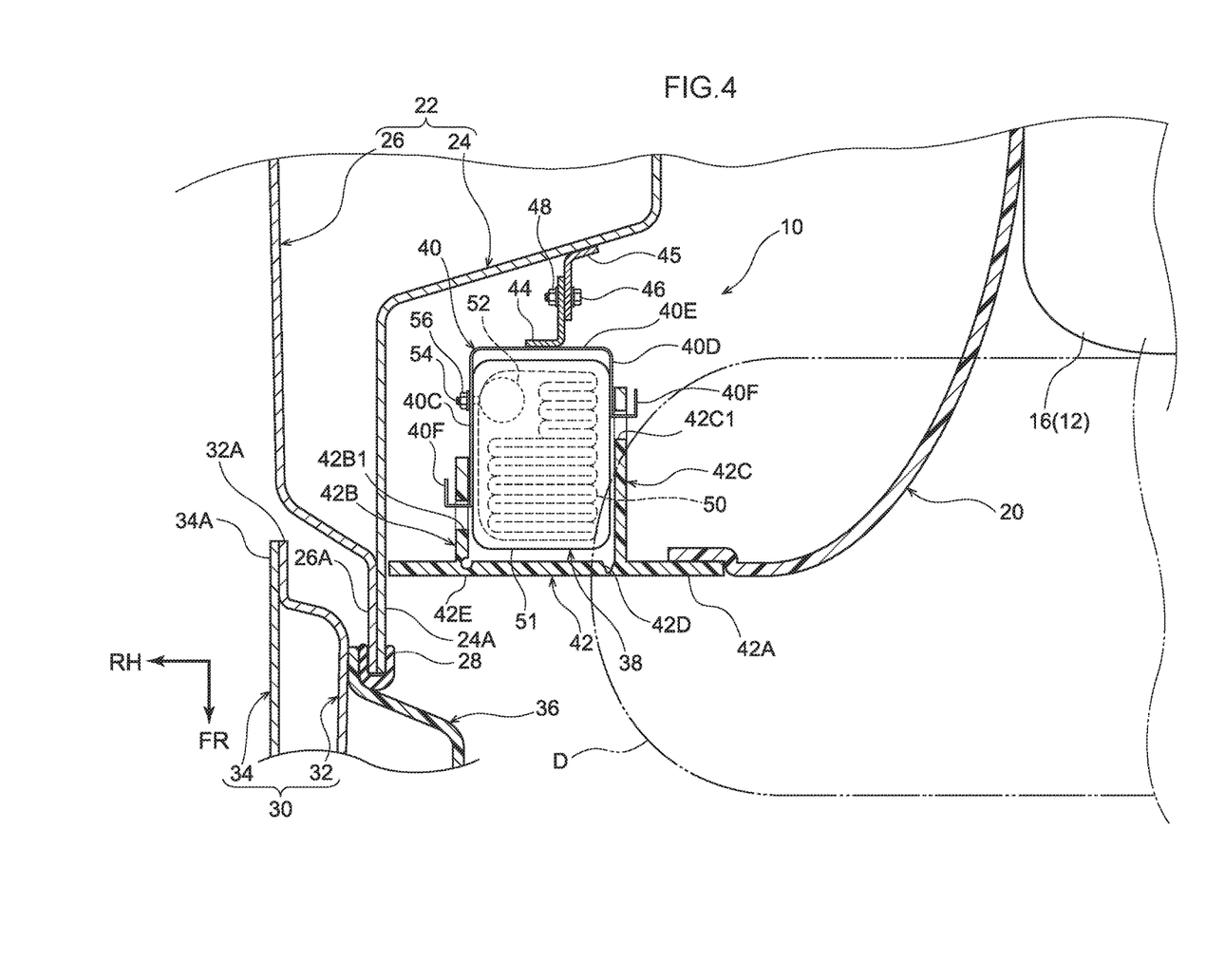
FIG. 4 is an enlarged cross-section corresponding to FIG. 2, for explaining a trajectory of an occupant in a side-on collision of the vehicle.

In the present exemplary embodiment, the stud bolt 54 projects out at the vehicle right side, this being the opposite side to the occupant D. This enables interference between the occupant D and the stud bolt 54 to be avoided or suppressed, even in cases in which, as illustrated in FIG. 4, the occupant D has moved under inertia toward the rear seat side airbag device 10 side in a collision such as a side-on collision.

In the present exemplary embodiment, the side wall 40C at the vehicle left side (vehicle width direction inside) of the case 40 is formed shorter. This enables interference between the occupant D and the case 40 to be avoided or suppressed, even in cases in which, as illustrated in FIG. 4, the occupant D has moved under inertia toward the rear seat side airbag device 10 side in a collision such as a side-on collision. Note that, since the airbag door 42 is formed of a thermoplastic elastomer or the like that is softer than the case 40, the vertical wall portion 42C is deformed and absorbs the impact when the occupant D has contacted the vertical wall portion 42C of the airbag door 42.

An exemplary embodiment of the present disclosure has been explained above; however, obviously various modifications may be implemented within a range not departing from the spirit of the present disclosure. In the present exemplary embodiment, for example, a state has been described in which the front end portion of the airbag module 38 projects out toward the vehicle front from the case 40; however, there is no limitation thereto, and the structure of a modified example illustrated in FIGS. 5 and 6 may be employed.

Modified Example

Figure 5:
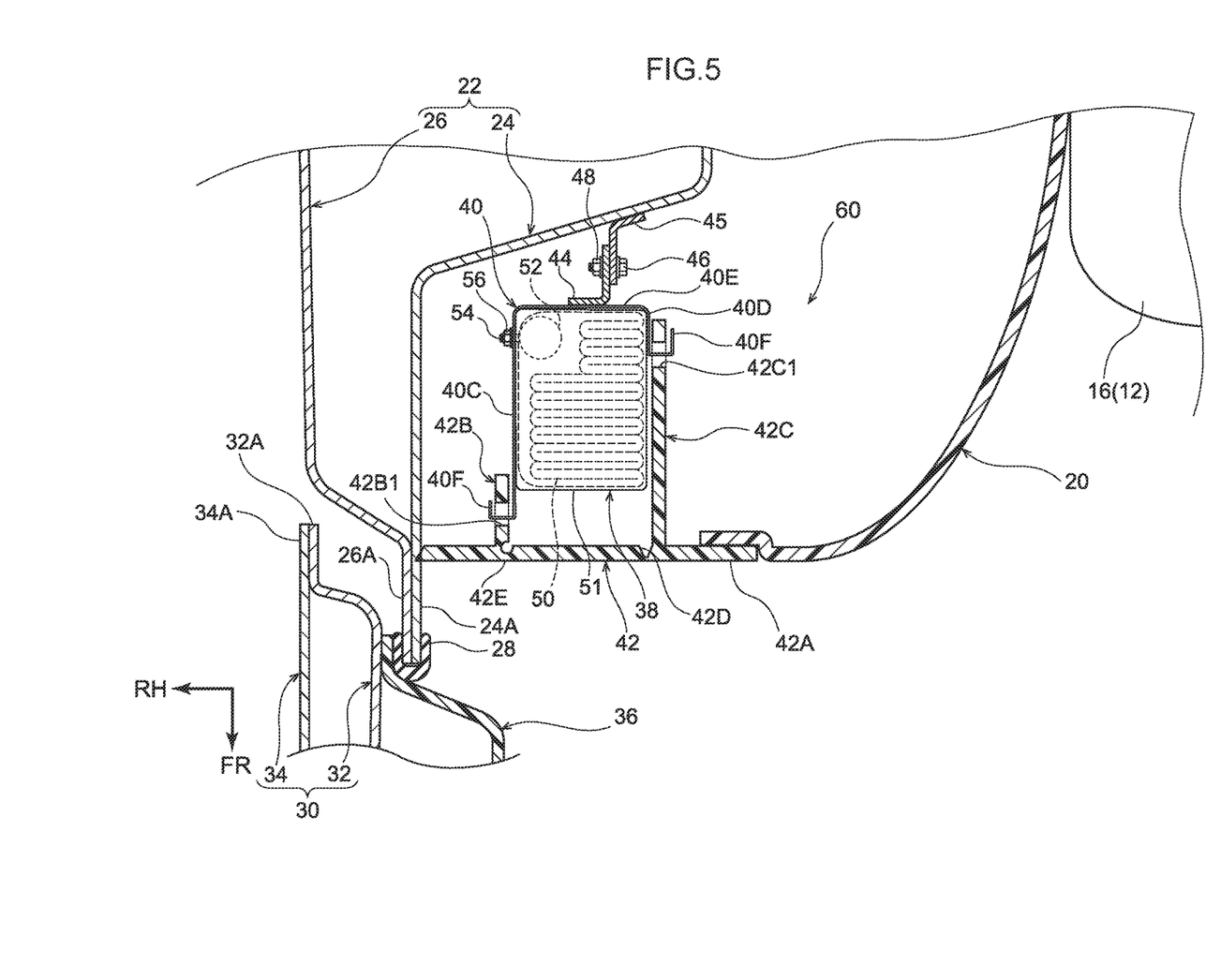
FIG. 5 is an enlarged cross-section corresponding to FIG. 2, illustrating a modified example of a rear seat side airbag device.
Figure 6:
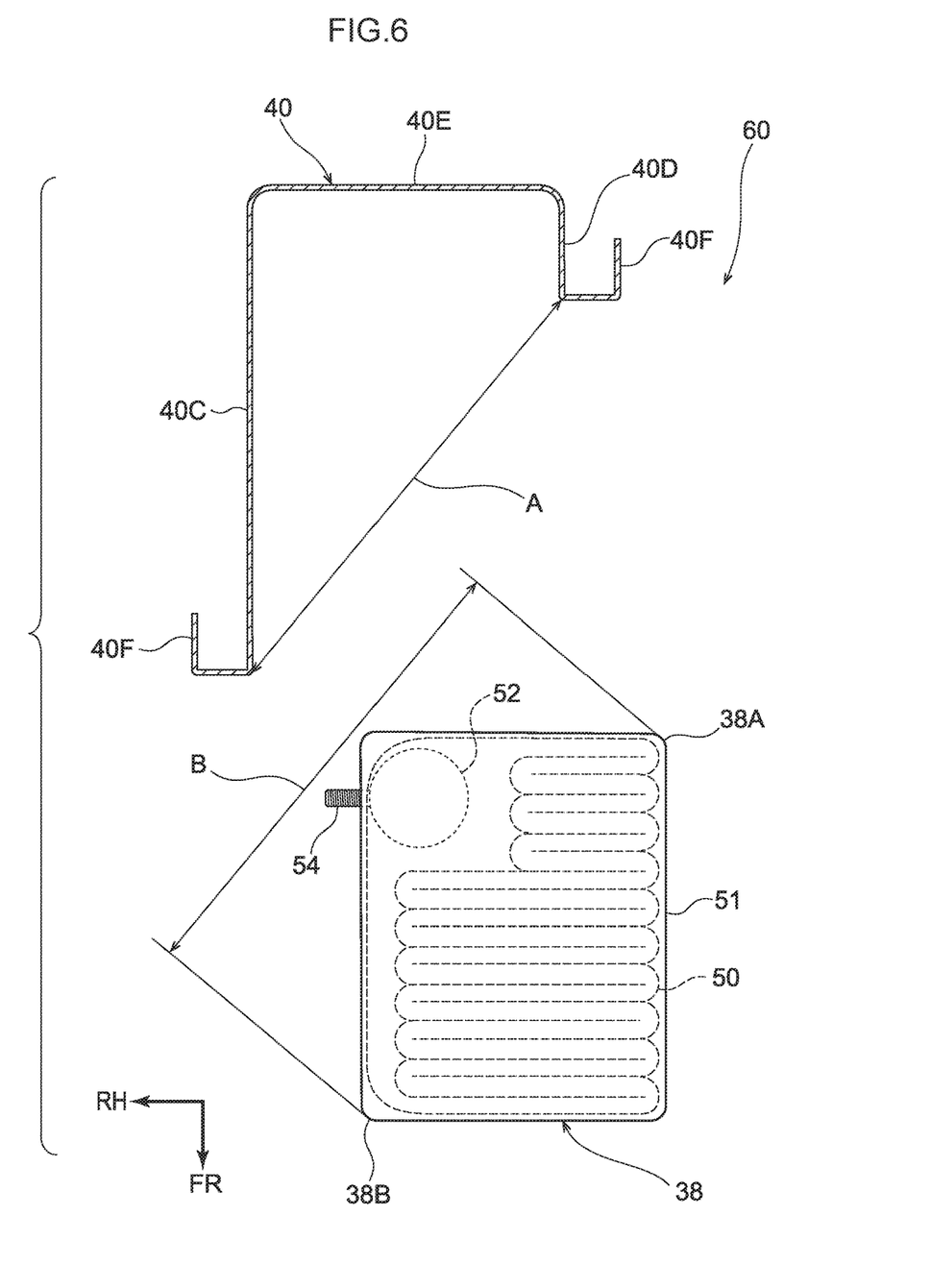
FIG. 6 is an enlarged cross-section illustrating relevant portions of the case and airbag module in FIG. 5, illustrating a state prior to the airbag module being assembled to the case.

As illustrated in FIG. 5, in a rear seat side airbag device 60 according to the modified example, the vehicle front-rear direction length of the airbag module 38 is formed shorter than that of the airbag module 38 in FIG. 2. Note that, as illustrated in FIG. 6, the length of a line linking respective front ends of the side wall 40C and the side wall 40D of the case 40 in plan view of the vehicle is an opening length A. The length of a diagonal line linking a corner portion 38A at a vehicle rear end side and vehicle left side of the airbag module 38, and a corner portion 38B at a vehicle front side and vehicle right side of the airbag module 38 in plan view of the vehicle is a diagonal length B. In the present modified example, the opening length A is formed longer than the diagonal length B.

In the present modified example, the opening length A of the case 40 is formed longer than the diagonal length B of the airbag module 38. Thus, the corner portion 38A and the corner portion 38B do not need to contact opening edges of the case 40 when inserting the airbag module 38 diagonally into the case 40. This enables the airbag module 38 to be easily assembled to the case 40 and enables the operation efficiency of the assembly operation of the airbag module 38 to the case 40 to be improved, compared to a structure in which the opening length A is shorter than the diagonal length B.

In the above-described exemplary embodiment and modified example, the airbag module 38 has a substantially rectangular shape in plan view of the vehicle; however, there is no limitation thereto, and an airbag module with another shape may be employed. In the above-described exemplary embodiment and modified example, the stud bolt 54 that projects out of the inflator 52 is fastened to the side wall 40C at the vehicle right side of the case 40; however, there is no limitation thereto. For example, a structure may be applied in which the stud bolt 54 projects out of the inflator 52 toward the vehicle left side and is fastened to the side wall 40D at the vehicle left side of the case 40.

In the above-described exemplary embodiment and modified example, the tear portion 42D is provided at the vehicle left side in addition to the hinge portion 42E provided at the vehicle right side of the airbag door 42; however, there is no limitation thereto. For example, a structure may be applied in which the tear portion 42D is provided at the vehicle right side and the hinge portion 42E is provided at the vehicle left side of the airbag door 42.

In the above-described exemplary embodiment and modified example, a structure has been described in which the stud bolt 54 projects out of the inflator 52; however, there is no limitation thereto. For example, a structure may be applied in which a diffuser that regulates gas is attached to the periphery of the inflator 52, and a stud bolt projects out of the diffuser.

What is claimed is:

1. A rear seat side airbag device comprising:
   a case that is disposed at a vehicle width direction outer-side of a seatback of a rear seat and including, in vehicle plan view, a bottom wall extending along a vehicle width direction and a pair of side walls extending toward a vehicle front from respective vehicle width direction end portions of the bottom wall, one of the side walls being formed with a shorter vehicle front-rear direction length than the other of the side walls; and
   an airbag module that is housed in the case and including a side airbag that deploys at a side portion of an occupant in a collision and an inflator, the inflator supplying gas to the side airbag and including a stud bolt projecting out in a vehicle width direction and fastened to the one side wall or the other side wall by the stud bolt, wherein:

in vehicle plan view, a length of a line linking respective front ends of the pair of side walls of the case is an opening length; and in vehicle plan view, a length of a diagonal line linking a corner portion at a vehicle rear end side and one vehicle width direction end side of the airbag module, and a corner portion at a vehicle front end side and the other vehicle width direction end side of the airbag module, is a diagonal length; then the opening length is formed longer than the diagonal length.

2. The rear seat side airbag device of claim 1, wherein the side wall at a vehicle width direction inner-side of the case is formed with a shorter vehicle front-rear direction length than the side wall at a vehicle width direction outer-side of the case.

3. The rear seat side airbag device of claim 1, wherein the inflator is fastened to the side wall at a vehicle width direction outer-side by the stud bolt projecting out toward a vehicle width direction outer-side.

4. The rear seat side airbag of claim 1, wherein the side garnish is separate from the rear seat.

5. A rear seat side airbag device comprising:

a case that is disposed in a side garnish at a vehicle width direction outer-side of a seatback of a rear seat and including, in vehicle plan view, a bottom wall extending along a vehicle width direction and a pair of side walls extending toward a vehicle front from respective vehicle width direction end portions of the bottom wall and each of the pair of side walls including at least one anchor hook, one of the side walls being formed with a shorter vehicle front-rear direction length than the other of the side walls;

an airbag module that is housed in the case and including a side airbag that deploys at a side portion of an occupant in a collision and an inflator, the inflator supplying gas to the side airbag and including a stud bolt projecting out in a vehicle width direction and fastened to the one side wall or the other side wall by the stud bolt; and an airbag door garnish including at least one anchor hole formed in each of a pair of vertical wall portions thereof and anchoring a corresponding anchor hook, one of the pair of vertical wall portions being formed with a shorter vehicle front-rear direction length than the other of the pair of vertical wall portions, wherein:

in vehicle plan view, a length of a line linking respective front ends of the pair of side walls of the case is an opening length; and in vehicle plan view, a length of a diagonal line linking a corner portion at a vehicle rear end side and one vehicle width direction end side of the airbag module, and a corner portion at a vehicle front end side and the other vehicle width direction end side of the airbag module, is a diagonal length; then the opening length is formed longer than the diagonal length.

6. The rear seat side airbag device of claim 5, wherein the side wall at a vehicle width direction inner-side of the case is formed with a shorter vehicle front-rear direction length than the side wall at a vehicle width direction outer-side of the case.

7. The rear seat side airbag device of claim 5, wherein the inflator is fastened to the side wall at a vehicle width direction outer-side by the stud bolt projecting out toward a vehicle width direction outer-side.

8. The rear seat side airbag of claim 5, wherein the side garnish is separate from the rear seat.

* * * * *